Oct. 15, 1957 J. P. CRUM 2,809,940
METHOD OF PRODUCING A SILVER CATALYST
Filed Jan. 12, 1954 3 Sheets-Sheet 1
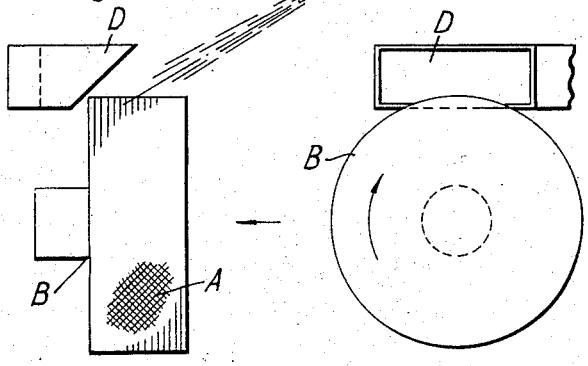
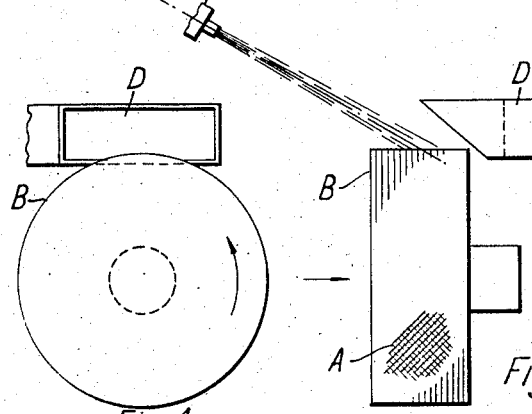
Inventor
John P. Crum
By Watson, Cole,
Grindle & Watson
Attorneys

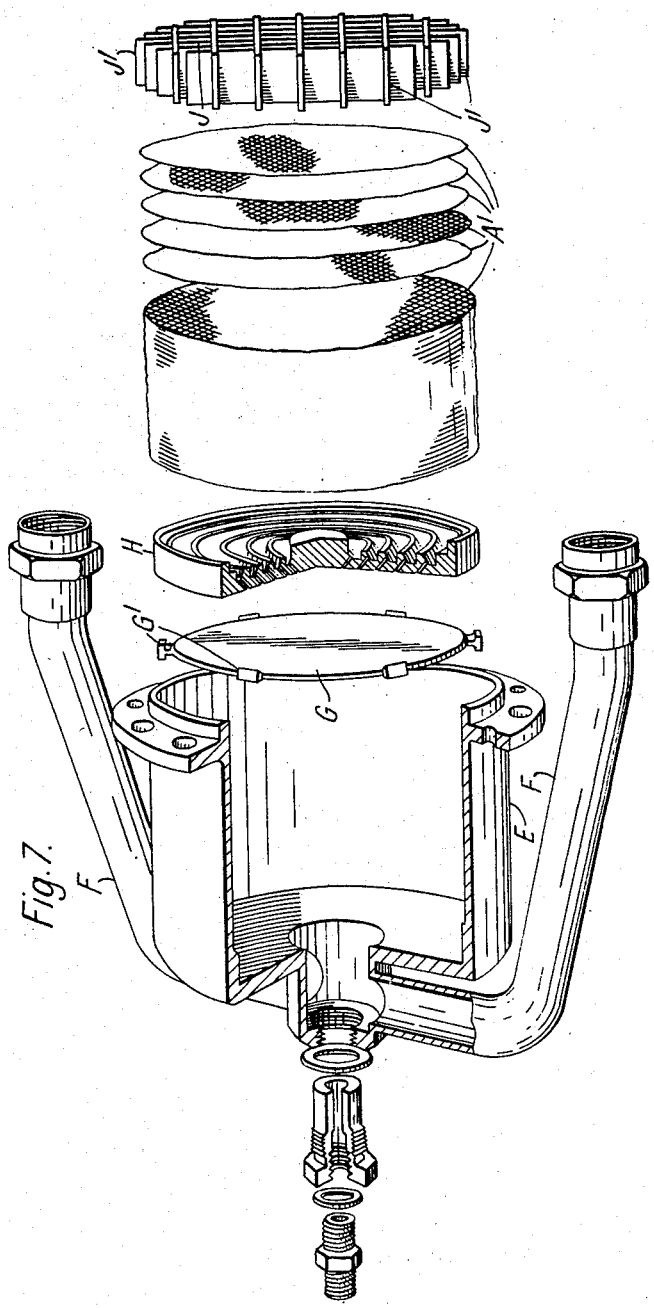

United States Patent Office 2,809,940
Patented Oct. 15, 1957

2,809,940

METHOD OF PRODUCING A SILVER CATALYST

John Paterson Crum, Luton, England, assignor to D. Napier & Son Limited, London, England, a company of Great Britain Application January 12, 1954, Serial No. 403,598

Claims priority, application Great Britain January 30, 1953

1 Claim. (Cl. 252—477)

This invention relates to catalytic elements for decomposing fluids and is particularly though not exclusively applicable to catalytic elements for decomposing a liquid such as hydrogen peroxide for use with a fuel in rocket motors.

A common form of catalytic element for such purposes as at present used is a series of metallic gauze discs packed together in a chamber to form the catalyst bed, the gauze being either woven from solid catalytic metal or being woven from some base metal which is then electroplated with the catalytic metal. Various metals have been used as catalysts, among others silver.

It has been found that such catalyst beds are, when new, relatively inactive and do not decompose $H_2O_2$ efficiently until a considerable quantity of $H_2O_2$ has been passed through them, or unless they are made excessively large. It is an object of the invention to provide an improved catalytic element which will obviate or reduce these disadvantages.

According to the present invention a catalytic element for decomposing a fluid, is manufactured by applying a layer of a catalytic metal by a hot spraying process to a basic perforate self supporting metallic structure. The basic structure will generally be in the form of perforated metal sheet or woven metal fabric or gauze.

Preferably the catalytic metal is silver, and the basic structure may comprise copper gauze, or may be formed of other metals. The hot spraying process is of the kind in which the catalytic metal is rendered molten and sprayed in molten form on to the basic structure.

The layer of catalytic silver is preferably in any case anodized in an alkaline carbonate solution such as sodium carbonate or potassium carbonate after the spraying process.

A catalytic element according to the invention for decomposing a fluid thus comprises a basic structure having a layer of catalytic metal applied thereto by a hot spraying process.

It is found that catalytic elements manufactured according to the invention give improved performance, due possibly it is believed to the granulated nature of the deposited silver, and/or to the unevenness of the surface of the silver coating, and/or to the presence of oxide in solution.

Figure 5:
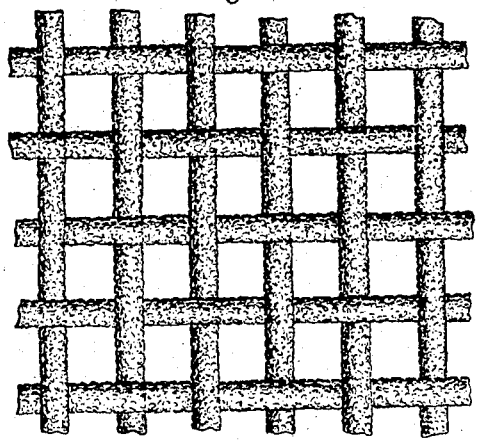
Figure 6:
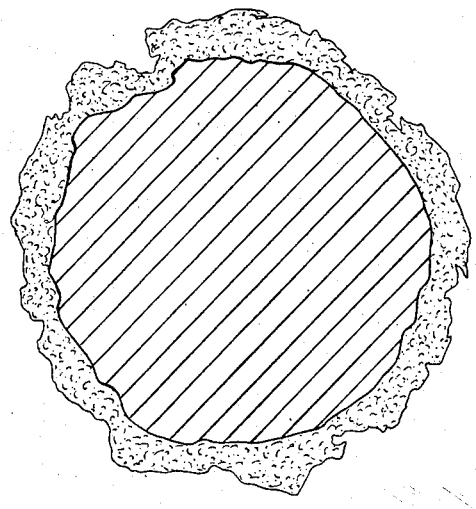

The invention may be performed in various ways but one example of the invention as applied to a catalytic element suitable for decomposing hydrogen peroxide and one form of apparatus in which such an element can be used are illustrated by way of example in the accompanying drawings, in which Figures 1 and 2, 3 and 4 show, somewhat diagrammatically the principal steps in the method of producing the catalytic element, Figures 1 and 3 being front elevations while Figures 2 and 4 are side elevations, Figure 5 shows on an enlarged scale the appearance of the element produced, Figure 6 is a cross-section on a very much enlarged scale illustrating the cross-section of one wire of the element produced, and Figure 7 is an exploded view of a device for decomposing hydrogen peroxide embodying a number of elements made in accordance with the invention.

In the form of the invention now to be described with reference to the drawings, the basic structure of the catalytic element to be produced comprises a copper gauze which may be, for example, a 20-mesh gauze made from 28-gauge copper wire. This gauze, which will normally be supplied in strip form, is cut into appropriate lengths and each of these lengths is first subjected to a gentle abrasive action by applying to it a known so-called "shot"-blasting process using, for example, 30-grade crushed grit. The gauze is then dipped in a manner known per se in a degreasing solution of known type such as carbon tetrachloride, washed and dried, taking care that it does not subsequently become contaminated with any foreign matter. Each length of gauze, which is shown at A in Figures 1 and 3, is then wrapped around a rotatable cylindrical support B as indicated in Figure 1, adjacent to but above one side of which support is rigidly mounted a metal spraying gun indicated at C, the axis of the nozzle of which makes an angle with the axis of rotation of the roller of about 30° and so that the spray is directed over substantially the whole width of the gauze on the cylindrical support. Also associated with the roller is an extractor D by which metal spray which does not impinge on or adhere to the gauze is collected and recovered. The metal spray gun is of known type and is fed with silver, for example in the form of wire, which is atomised and melted by the spray gun and thus impinges upon the wire gauze in the form of a series of droplets which when they impinge upon the gauze adhere to the surface of the wire forming the gauze and to each other. The cylindrical support is rotated during the spraying operation so that the whole of the appropriate face of the gauze is subjected to the metal spray.

In a typical example where the length of each strip of gauze is, say, approximately four feet and its width 6¼ inches, the rate of rotation of the cylindrical support might be 5 revolutions per minute, the distance of the metal spray gun from the gauze might be about 7 inches, while the rate of feed of silver to the gun might be represented by the delivery to the gun of 1½ millimeter diameter silver wire at a rate of 50 inches per minute.

After the spraying operation indicated in Figures 1 and 2 is completed, the gauze is subjected to the spraying operation indicated in Figures 3 and 4, this spraying operation being similar to that shown in Figures 1 and 2 except that the spray gun C directs its spray from the opposite side of the gauze so that during the two operations indicated respectively in Figure 1 and Figure 3 the two exposed sides of the wires constituting the metal gauze tend both to be coated with sprayed-on silver. If the gauze is to be of a kind which has the catalytic silver applied to one face only of it, the strip of gauze is then removed from the cylindrical support for further treatment and cutting into any desired shape such as discs, several of which are indicated at A¹ in Figure 7. If, on the other hand, the gauze is to have both its faces coated with silver as in many cases will be preferable, it is removed from the cylindrical support after the operations indicated in Figures 1 to 4 have been performed thereon, is then reapplied to the cylindrical support with its already coated face inwards, and the operations indicated in Figures 1 and 3 are repeated so as to coat the other face of the gauze with catalytic silver.

After the gauze has been coated with catalytic silver on one or each face and either before or after it has been cut into discs or other desired shape, it is subjected to further treatment including an anodising treatment in a bath consisting of a solution of sodium carbonate. In applying this further treatment the silver-coated gauze is first degreased in a vapour bath of trichlorethylene, after which it is immersed in a cleaner (such as a solution of the substance sold under the registered Trademark "Zonax") for 10 minutes at 180° to 190° F. Thereafter it is swilled in cold tap water and then placed in a bath containing a solution of sodium carbonate at a concentration of 92 grammes per litre (1 pound per gallon soda ash) at room temperature. A cathode of mild steel, which may be the bath itself, is arranged in contact with the solution and the silver-coated gauze is anodised until it appears grey or black, that is to say for a period in one example of about 1 minute at a current density of 20 amperes per square foot of projected area. The gauze is then subjected to a rapid swill in cold tap water and finally is thoroughly swilled in cold distilled water and dried.

In some cases it is desirable as a final production operation to subject each gauze for a short period to hydrogen peroxide so that it acts catalytically to decompose a small proportion of such hydrogen peroxide since it has been found that this final operation tends to cause the gauze when put into final use to begin decomposition of hydrogen peroxide in the apparatus in which it is used with a smaller amount of delay than is the case where a gauze has not been subject to the final operation referred to.

The gauze thus produced appears when magnified about two hundred times somewhat as shown in Figure 5 while a cross section through one wire of the gauze magnified about five hundred times appears somewhat as shown in Figure 6.

In the example of apparatus in which gauzes according to the invention may be used shown in Figure 7, the apparatus comprises a cylindrical housing E to one end of which hydrogen peroxide is to be delivered through pipes indicated at F, while from its other end the decomposition products are delivered. Arranged within the housing in turn starting from the end to which the hydrogen peroxide is delivered are, (1) an initial distributor plate G which is in the main of smaller diameter than the interior of the housing but has radial projections $G^1$ which space it from the inner circumferential wall of the housing thus provide an annular gap between the disc and the circumferential wall of the housing through which the hydrogen peroxide passes the plate G, (2) a main distributor plate H having formed therein a series of distributor passages and having a specially formed face designed to spread substantially evenly over the whole cross-sectional area of the interior of the housing the hydrogen peroxide which passes the plate G, (3) a series of closely packed gauzes $A^1$ comprising, for example, 45 gauzes manufactured in the manner above described by spraying on both faces, followed by 20 gauzes formed by spraying on one face only, and (4) a grid-like pressure plate J through which the products of decomposition flow, the circumferentially projecting ends $J^1$ of the parts constituting this plate being arranged to be engaged by the adjacent end of a passage member (not shown) through which the products of the decomposition are led to the point of use, so that the plate J clamps the gauzes $A^1$ and the plates G and H in place and takes the loads represented by the pressure drop through the stack of gauzes and the plates G and H.

What I claim as my invention and desire to secure by Letters Patent is:

A method of manufacturing a catalytic element for decomposing a stream of hydrogen peroxide comprising directing finely divided molten silver by means of a hot spraying process against at least one face of a sheet of open-mesh copper fabric in two directions both inclined to the plane of the surface of the fabric and from opposite sides of parallel planes normal to the surface of the fabric.

References Cited in the file of this patent
UNITED STATES PATENTS

| Number | Name | Date |
|---|---|---|
| 1,671,620 | Marchthal | May 29, 1928 |
| 2,111,584 | Eversole | Mar. 22, 1938 |
| 2,174,840 | Robinson et al. | Oct. 3, 1939 |
| 2,251,913 | Brennan | Aug. 12, 1941 |
| 2,404,824 | Bool | July 30, 1946 |
| 2,465,773 | Wernlund | Mar. 29, 1949 |
| 2,615,930 | Moulton et al. | Oct. 28, 1952 |